G. A. BURNHAM.
ELECTRICAL DISTRIBUTION SYSTEM.
APPLICATION FILED MAY 27, 1916.
1,259,453.
Patented Mar. 12, 1918.
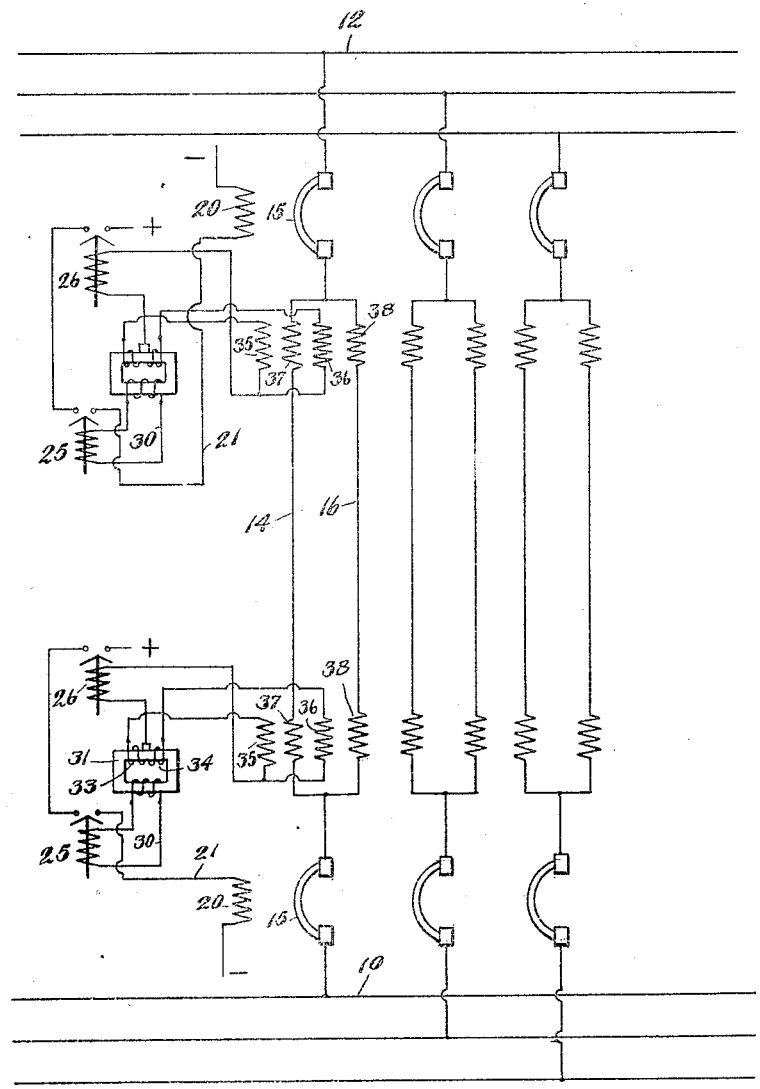

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

ELECTRICAL DISTRIBUTION SYSTEM.

1,259,453. Specification of Letters Patent. Patented Mar. 12, 1918.

Application filed May 27, 1916. Serial No. 100,383.

*To all whom it may concern:*

Be it known that I, GEORGE A. BURNHAM, a citizen of the United States, residing at Saugus, in the county of Essex and State of Massachusetts, have invented an Improvement in Electrical Distribution Systems, of which the following is a specification.

This invention relates to a system of electrical distribution commonly known as a split conductor system. Such a system usually comprises a divided conductor arranged between two buses or stations and electrically connected therewith through switches, there being one such divided conductor for each phase of the current. The switches at the ends of the divided conductor are designed to disconnect the conductor from the buses at both ends, and means are employed, such as current transformers, or their equivalent, to control the operation of the switches in combination with so-called relays upon the occurrence of a fault, which fault may cause reverse current flow by which a normal balance in the divided conductor is disturbed. In these systems a reverse current flow in the primary coils of the current transformers will cause a flow of current in the secondaries by which to control the operation of the switches to disconnect the conductor from the buses.

It is desirable that the switches shall not be opened upon a momentary or trivial reverse current flow, which they would do if means were not provided to prevent such operation, and it is not practicable to employ current transformers of such proportions and capacities as will accomplish this result.

One of the objects of my invention is the provision of means arranged in or controlled by the secondaries of the current transformers, adapted to open the switches upon a reversal of the current flow, which means will not operate to effect such switches upon a momentary or trivial reverse current flow, but will operate only in case the reverse current flow is above a predetermined value.

In the embodiment of my invention, as here shown, a differential transformer is arranged at each end of the conductor, in the secondaries of the current transformers, and the primary coils of each differential transformer are oppositely disposed or arranged to buck each other, under normal condition of current flow, so that their effect is negligible, but upon reverse current flow they will act cumulatively to cause the current which flows in the secondary of said differential transformer, to operate a relay controlling the circuit of the switch. This provides for operating the switches on a reverse current flow, but to prevent operation of the switches, except when the current flow is above a predetermined value, there are provided other relays for the circuits of the switches, adapted to respond to an overload, and unless both relays are operated and the circuit controlled by them closed, the switches will not be opened. Said overload relays are connected with the primary coils of the differential transformers, and will respond when the coils act cumulatively, and the current flow is above a predetermined value.

Upon the occurrence of a fault, or short circuit, there is a reversal of current flow and also an overload, and I utilize both to operate the switches.

The figure is a diagrammatical view illustrating one embodiment of my invention.

The usual split conductor system, which is here shown comprises two buses or stations 10 and 12, a divided conductor comprising parallel members 14 and 16, which conductor is connected at each end, respectively, with the buses 10 and 12, through switches 15, 15. These switches are normally closed, but adapted, when opened, to disconnect the divided conductor from both buses. There may be a divided conductor and associated switches for each phase of the current.

The trip-coils 20, for the switches 15, are connected in circuits 21, and said circuits are controlled by relays 25 and 26, said circuits 21 being normally open and adapted to be closed only when both relays 25 and 26 are operated. The relays 25 are adapted to be energized and consequently operated by means affected by a reverse current flow, and the relays 26 are adapted to be energized and consequently operated upon a current above the normal setting.

The relays 25 are controlled by differential transformers, said relays being arranged in the secondaries 30, which are here shown as wound on one arm of the magnet-cores 31, and on the other arm of said cores two primary coils 33 and 34 are wound, which are connected in the secondaries 35 and 36, of the current transformers arranged at each end of the divided conductor, the primary coils 37 and 38 of which are connected, respectively, in the current paths of the members 14 and 16 thereof.

The primary coils 33 and 34 of the differential transformers are oppositely wound or otherwise arranged in opposition to buck or neutralize each other, so that, normally, their effect is negligible and consequently there is but little current flow through the secondaries 30, and the relays 25 are not affected.

A reversal of current flow, due to a fault or short circuit, results in the two oppositely arranged primary-coils 33 and 34, acting cumulatively, whereupon there is a flow of current in the secondaries 30, which may be sufficient to operate the relays 25. In case the fault is momentary or the reverse current flow of trivial value, the relays 25 may and probably will be operated, but, under such conditions, as it is not desired to open the switches, hence controlling-means are provided including the relays 26, which are responsive to an overload of at least a predetermined value.

Upon the occurrence of a fault, or short circuit, there may be a reversal of current and also an increase in current value, and I provide overload controlling-means for the switches, such as the relays 26, as well as controlling-means effected by the reversal of current flow, such as the relays 25. As here shown, the relays 26 are arranged in the secondaries of the current transformers, in series with the primary-coils of the differential transformers, so that upon a reverse current flow of at least a given value, the relays 26 will become energized and will operate to close the circuits of the switches, at such points. It will be understood that at such moment the relays 25 will be also operated so that the circuits 21 of the switches will be closed and the switches caused to operate and disconnect the conductor from the buses, at both ends.

The operation of my invention will be obvious from the foregoing description.

I claim:—

1. In a system of electrical distribution the combination with a divided conductor connected at each end through switches with buses, means associated with said divided conductor and energizable by the current flow therein, means connected with the aforesaid means and normally non-responsive, but responsive upon a reverse current flow in said divided conductor to operate said switches to disconnect the conductor from the buses at both ends, and means in the connection between the first named means and the reverse current responsive means and responsive to an overload to control said reverse current, responsive means in the operation of said switches.

2. In a system of electrical distribution, the combination with a divided conductor connected at each end through switches with buses, current transformers arranged in said conductor, at the ends thereof, means in a circuit with and controlled by said current transformers normally non-responsive but responsive upon a relative reversal of current flow in said transformers to operate the switches to disconnect the conductor from the buses, and means in a circuit between said current transformers and reverse current responsive means to govern the operation of said reverse current responsive means in the operation of said switches.

3. In a system of electrical distribution, the combination with a divided conductor connected at each end through switches with buses, current transformers arranged in said conductor, at the ends thereof, differential transformers connected with the secondaries of said current transformers, the primary-coils of which are wound in opposition to buck each other under normal conditions of current flow, but to act cumulatively upon a reversal of the current flow, means controlled by said differential transformers to operate the switches, and means arranged in the connection between said current and differential transformers adapted to control the operation of the switches by the aforesaid means.

4. In a system of electrical distribution, the combination with a divided conductor connected at each end through switches with buses, current transformers arranged in said conductor, at the ends thereof, differential transformers associated with the secondaries of said current transformers, the primary-coils of which are wound in opposition to buck each other under normal conditions of current flow, but to act cumulatively upon a reversal of the current flow, means controlled by said differential transformers to operate the switches, and means arranged in the connection between said current and differential transformers and responsive to an overload to control said switch operating means.

5. In a system of electrical distribution, the combination with a divided conductor connected at each end through switches with buses, relays controlling the switches, differential transformers, in the secondaries of which said relays are connected, said differential transformers each having two primary-coils normally arranged in opposition, to neutralize each other, but adapted to act cumulatively upon a reversal of current flow, and current transformers arranged at the ends of the divided conductor in the secondaries of which said primary-coils of the differential transformers are arranged, which are affected by a reverse current flow, to cause said primary-coils of the differential transformers to act cumulatively and overload responsive means arranged in the circuit connecting said current and differential transformers adapted to control the operation of the switches by said relays.

6. In a system of electrical distribution, the combination with a divided conductor connected at each end through switches with buses, relays controlling the switches, differential transformers in the secondaries of which said relays are connected, said differential transformers each having two primary-coils normally arranged in opposition to neutralize each other, but adapted to act cumulatively upon a reversal of current flow, current transformers arranged at the ends of the divided conductor, in the secondaries of which said primary-coils of the differential transformers are arranged, which are affected by a reverse current flow, to cause said primary-coils of the differential transformers to act cumulatively, and other relays controlling the operation of the switches by the aforesaid relays arranged in the secondaries of the current transformers, and responsive to a current flow.

In testimony whereof, I have signed my name to this specification, in the presence of two subscribing witnesses.

GEORGE A. BURNHAM.

Witnesses:
 DANIEL M. SHIFFERT,
 HAROLD S. RAMSAY.

Copies of this patent may be obtained for five cents each, by addressing the "Commissioner of Patents, Washington, D. C."